United States Patent [19]

Sakakibara et al.

[11] Patent Number: 5,397,420
[45] Date of Patent: Mar. 14, 1995

[54] FINE STRUCTURE FORMING DEVICE

[75] Inventors: Nobuyoshi Sakakibara, Kariya; Takayuki Tominaga, Chiryu; Michio Hisanaga, Nagoya; Tadashi Hattori, Okazaki; Yoshitaka Gotoh, Toyoake; Naohito Mizuno, Anjo, all of Japan

[73] Assignee: Nippondenso Co., Ltd., Kariya, Japan

[21] Appl. No.: 935,104

[22] Filed: Aug. 27, 1992

[30] Foreign Application Priority Data

Mar. 3, 1991 [JP] Japan .................................. 4-045444
Aug. 30, 1991 [JP] Japan .................................. 3-220175

[51] Int. Cl.$^6$ ............................................. H05H 1/00
[52] U.S. Cl. ................................. 156/345; 156/643; 250/492.2
[58] Field of Search ............... 156/643, 646, 644, 345; 219/121.41, 121.4, 121.85, 121.69, 121.71; 250/492.2

[56] References Cited

U.S. PATENT DOCUMENTS

| | | | |
|---|---|---|---|
| 4,550,257 | 10/1985 | Binnig et al. | 118/723 X |
| 4,564,736 | 1/1986 | Jones et al. | 219/121.68 X |
| 4,866,238 | 9/1989 | Karube | 219/121.74 X |
| 4,960,495 | 10/1990 | Mori et al. | 156/643 X |
| 5,047,649 | 9/1991 | Hodgson et al. | 250/492.2 |
| 5,062,364 | 11/1991 | Lewis et al. | 101/467 |
| 5,149,404 | 9/1992 | Blonder et al. | 156/643 X |

OTHER PUBLICATIONS

Precision Engineering Institute, Takeo Sato et al, pp. 989–991, Jun. 1989.
Super LSI Processing data Hand Book, pp. 180–197, Mar. 1990.
Laser Hand Book pp. 691–703.
Catalogue of "Panasonic", "Micro Electric Discharge Machine", p. 990, Oct. 20, 1990.
English abstract of Japanese laid open application No. 61-111858, May 1986.
English abstract of Japanese laid open application No. 61-111859, May 1986.
English abstract of Japanese laid open application No. 2-131822, May 1990.
English abstract of Japanese laid open application No. 2-131825. May 1990.
English abstract of Japanese laid open application No. 2-250719, Oct. 1990.

Primary Examiner—Thi Dang
Attorney, Agent, or Firm—Cushman, Darby & Cushman

[57] ABSTRACT

A micro machining apparatus forms a high-aspect structure having an optional depth in a workpiece at low cost. The apparatus applies high-frequency electric power to the workpiece and a machining electrode, to form a plasma zone in the vicinity of the leading end of the machining electrode. The apparatus guides a reactive gas into the plasma zone to activate the gas. The activated gas is adsorbed by the surface of the workpiece that faces the leading end of the machining electrode. The adsorbed gas reacts with the material of the workpiece and locally etches off the surface of the workpiece. A feed mechanism of the apparatus feeds the machining electrode toward the workpiece according to the progress of the etching, thereby forming a trench in the workpiece. Reaction products of the workpiece and reactive gas produced by the etching adhere to and deposit on the sidewall of the trench and form a protective film for protecting the sidewall from being etched, thereby providing the trench with a high aspect ratio.

8 Claims, 8 Drawing Sheets

FINE STRUCTURE FORMING DEVICE

BACKGROUND OF THE INVENTION

1. Field of the Invention

The present invention relates to micro machining technology and, particularly, to a micro machining apparatus for machining a micro trench, which has a high aspect ratio and serves as, for example, a shaft hole of a micro-motor and a pressure guide hole of a pressure sensor.

2. Description of the Related Art

FIG. 6(a) shows an example of a micro machining apparatus employing an electric discharge machining technique, for machining micro trenches and holes.

In the figure, a workpiece 110 is held by a holder electrode 130 and immersed in oil 100. A machining electrode 121 is made of high-rigid material such as tungsten, which is hardly broken by internal defects even when shaped into a thin wire. A feed mechanism 120 rotates and feeds the machining electrode 121 toward the workpiece 110.

The electric discharge machining technique makes a very small hole as an accumulation of craters each formed by a shot of electric discharge. In FIG. 6(a), an RC electric discharge circuit 131 provides shots of electric discharge. Electric discharge energy E(J) of each shot is expressed as follows:

$$E = (C \cdot V^2)/2 \qquad (1)$$

where C is capacitance and V is a voltage applied to the electrodes.

Each shot of the electric discharge energy E bores the workpiece 110 while the machining electrode 121 is being fed toward the workpiece 110, thereby forming a very small hole 111 in the workpiece 110.

Since the apparatus employing the electric discharge machining technique forms a fine hole as an accumulation of craters each formed by a shot of electric discharge, the finished surface of the hole is rough. To provide a smoother finished surface, the discharge energy E of the equation (1) must be reduced and, to achieve this, the apparatus must have as small a floating capacitance as possible.

In addition, the material of a workpiece to be processed by the electric discharge machining apparatus must be electrically conductive.

As the depth (aspect ratio) of the hole 111 bored by the apparatus deepens, the machining electrode 121 goes deep inside the workpiece 110. As a result, electric discharge occurs not only at the leading end of the machining electrode 121 but also over the body thereof, to cause a problem that a diameter L' of the hole 111 at the surface of the workpiece 110 differs from a diameter L at the bottom of the hole 111, as shown in FIG. 6(b). The electric discharge machining technique, therefore, hardly provides a hole having a uniform diameter.

Another technique of providing a high-aspect structure is an LIGA method, i.e., a lithographic electroforming method. This method thickly applies PMMA resist over a substrate, photolithographically processes the resist with X rays to form a mold, and electrically casts metal into the mold, thereby providing a high-aspect structure.

This LIGA method, however, requires SOR (Synchrotron Orbital Radiation), which is expensive to drastically increase facility costs.

A dry etching technique employed for fabricating VLSI devices is also useful to prepare a fine trench. The dry etching technique applies a mask over a workpiece, patterns the mask by photolithography, and etches openings of the mask by active species such as ions and radicals. Reaction products adhere to the side face of each anisotropically etched trench and form a protective film, which helps the trench have a high aspect ratio.

Since this technique photolithographically patterns a mask laid over a workpiece, the workpiece must have a two-dimensional shape. Namely, the VLSI dry etching technique is not applicable for machining a three-dimensional workpiece. To fabricate as many devices as possible, it is necessary for the VLSI dry etching technique to prepare a large uniform reaction zone. Even when forming a very small trench, the VLSI dry etching technique exposes the whole workpiece to the reaction zone where plasma exists. Accordingly, parts already processed on the workpiece are always exposed to the reaction zone. This situation must be carefully taken into consideration in the course of the etching.

Namely, processing parameters must be precisely set before forming a fine trench, or else the trench will be tapered from a wide surface entrance toward a narrow bottom or will have a beer barrel shape. The processing parameters that may provide a deep trench having a required sectional shape are very difficult to find and accurately set. In practice, there is, therefore, a limit to the depth of a trench.

Reactive species produced in the reaction zone reach the bottom of the trench by diffusion and react with and etch the bottom. As the depth of the trench deepens, the reactive species hardly reach the bottom to delay an etching speed. This also limits the depth of a trench to be formed.

There are other trench machining techniques such as a laser radiation technique and an ion radiation technique, which physically bore a trench in a workpiece by melting, sublimation, or spattering. These techniques employ a beam of high energy which may not only damage the surface of a workpiece but also differ in the sizes of the entrance and bottom of a trench formed.

SUMMARY OF THE INVENTION

In consideration of these problems of the conventional techniques, an object of the present invention is to provide a high aspect structure having an optional depth, an accurate shape, and a smooth finished surface, at low cost irrespective of materials.

In order to accomplish the object, a micro machining apparatus according to the present invention disposes a very thin linear member opposite to a workpiece, forms a plasma zone or an optically assisted reaction zone between the leading end of the linear member and the workpiece, locally produces active species by decomposing and dissociating a reactive gas in the zone, and feeds the linear member toward the workpiece while maintaining a predetermined distance between the leading end of the linear member and the bottom of an etched hole of the workpiece. As a result, the workpiece is locally etched off at atomic level, and reaction products are successively deposited over the sidewall of the etched hole, to form a protective film.

The reactive gas is decomposed and dissociated in the limited zone between the leading end of the linear member and the bottom of the etched hole of the workpiece, to produce active species for etching the workpiece at atomic level. Accordingly, the present invention provides a smoother finished surface than the conventional electric discharge machining apparatus, on any material.

The present invention feeds the thin linear member toward the workpiece while keeping a given distance between the leading end of the linear member and the bottom of the etched hole of the workpiece, so that the etched hole may have a high aspect ratio and an optional depth.

Since the present invention decomposes and dissociates the reactive gas only in the limited reaction zone between the leading end of the linear member and the etched bottom of the workpiece, the whole area except the reaction zone of the workpiece will never be affected by the reactive gas. Namely, the sidewall of the etched hole of the workpiece will never be etched, except in the limited zone very close to the bottom of the etched hole. Reaction products produced in the reaction zone are successively deposited over the sidewall of the etched hole to serve as a protective film for protecting the etched sidewall from the active species. This is why the etched part of the workpiece may have a uniform shape in a depth direction.

In this way, the present invention provides a high-aspect structure having an optional depth, an accurate shape, and a smooth finished surface, from any material at low cost.

DESCRIPTION OF THE PREFERRED EMBODIMENTS

The embodiments of the present invention will be explained in detail with reference to the drawings.

Figure 1:
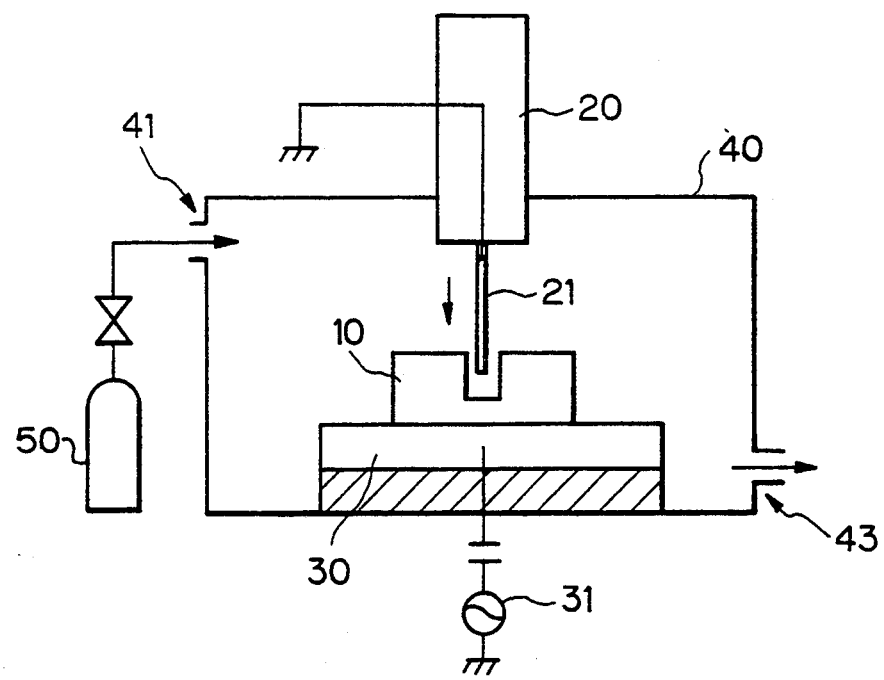
FIG. 1 is a view showing a micro machining apparatus according to a first embodiment of the present invention.

FIG. 1 shows a micro machining apparatus according to the first embodiment of the present invention.

A workpiece 10 is held by a holder electrode 30 in a vacuum vessel 40. The holder electrode 30 is a cathode electrode having a cathode coupling structure to which high-frequency electric power 31 is applied.

Opposite to the cathodic holder electrode 30, there is disposed an anodic machining electrode (very thin linear member) 21 in the vacuum vessel 40. The machining electrode 21 is made of high-rigid material such as tungsten which is hardly broken by internal defects even if shaped into a thin wire. A feed mechanism 20 feeds the machining electrode 21 toward the workpiece 10. The diameter of the machining electrode 21 is determined depending on the diameter of a trench to be formed in the workpiece 10. Namely, trenches of different diameters may be formed by replacing the machining electrode 21.

The vacuum vessel 40 has an inlet 41 for introducing a reactive gas 50 into the vessel 40. The introduced reactive gas 50 is subjected to the high-frequency power 31 and converted into reactive species such as radicals and ions. These reactive species chemically react with or locally hit the workpiece 10, which is etched thereby. A speed of feeding the machining electrode 21 by the feed mechanism 20 is set in advance according to machining conditions, so that a distance between the leading end of the machining electrode 21 and the etched surface of the workpiece 10 is kept constant during the etching. This distance is determined according to, for example, the Debye length (the minimum unit of glow plasma) of plasma gas in a way to properly produce plasma discharge between the leading end of the machining electrode 21 and the workpiece 10.

Namely, to produce proper plasma discharge between the leading end of the machining electrode 21 and the workpiece 10, a distance from the leading end of the electrode to the workpiece must be several times the Debye length of plasma gas. The Debye length is expressed as follows:

$$\lambda_D = 7.43 \times 10^3 \cdot \sqrt{(T_e/n_e)} \ (m) \tag{2}$$

where $n_e$ is an electron concentration ($m^{-3}$), and $T_e$ is an electron temperature (eV).

Electric discharge etching usually employs low-voltage-discharged plasma with $n_e = 10^{15}$ ($m^{-3}$) and $T_e = 2$ (eV). This results in $\lambda_D = 3.32 \times 10^{-4}$ (m). Namely, a distance of several millimeters must be secured between the leading end of the machining electrode 21 and the workpiece 10 to produce proper plasma.

The gas after the reaction is discharged through a discharge port 43. The reaction in the vacuum vessel 40 may be monitored by spectrally analyzing the plasma produced. This is useful to improve the accuracy and speed of the etching and to detect an end point.

Figure 2:
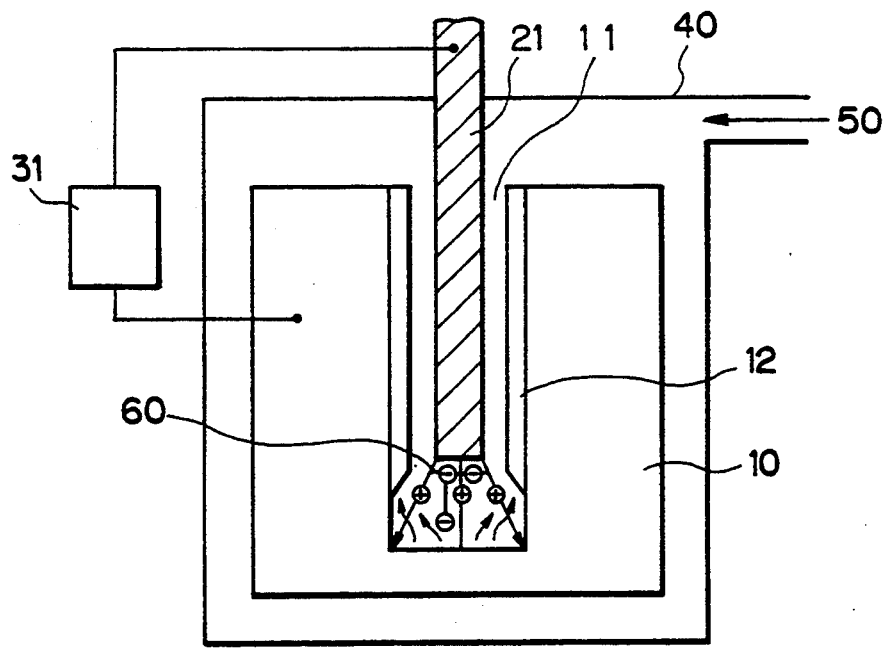
FIG. 2 is a view showing the essential part of the first embodiment.

FIG. 2 shows a trenching work carried out by the apparatus of FIG. 1.

In FIG. 2, the workpiece 10 is made of semiconductor (silicon) and the reactive gas 50 introduced into the vacuum vessel 40 is a halogen-based gas.

The feed mechanism 20 feeds the machining electrode 21 toward the workpiece 10, and the power source 31 applies a voltage to the electrode 21 and workpiece 10 so that a plasma (glow plasma) zone 60 is locally formed between the leading end of the electrode 21 and the workpiece 10. In this plasma zone 60, the reactive gas 50 is decomposed and dissociated to produce active species such as radicals and ions. The active species are adsorbed by the surface of the workpiece 10 exposed to the plasma zone 60 and react with the material of the workpiece 10, to locally etch off the workpiece 10.

When the reactive gas is mainly composed of HBr, reaction occurring with the surface of the silicon workpiece (Si) 10 will be as follows:

$$Si + HBr \rightarrow SiBrx + H \quad (3)$$

This reaction etches off the surface of the workpiece (Si) 10 and produces reaction products (SiBrx), which adhere to and deposit over the sidewall of the etched part of the workpiece 10, to form a protective film 12. The protective film 12 protects the sidewall from being etched further.

The feed mechanism 20 feeds the machining electrode 21 toward the workpiece 10 while maintaining a fixed distance between the leading end of the machining electrode 21 and the etched bottom of the workpiece 10. During the etching, the protective film 12 is continuously formed on the sidewall of the etched part, to provide the trench 11 with an optional depth and a uniform inner diameter in a depth direction.

The machining electrode 21 may be orthogonally fed toward the workpiece 10 to form a single trench. Alternatively, the machining electrode 21 may be moved in a plane of the workpiece 10 to form an optional patterned trench.

The workpiece thus processed is used as it is or as a mold for electrically casting metal. In the latter case, a plurality of high-aspect structures are manufacturable.

The material of the workpiece may be not only semiconductor but also metal, dielectric material, insulator, etc. The reactive gas that produces active etching species such as ions and radicals may be selected among O-, F-, and Br-based gases and other gases depending on the material of a workpiece to be processed.

Figure 3:
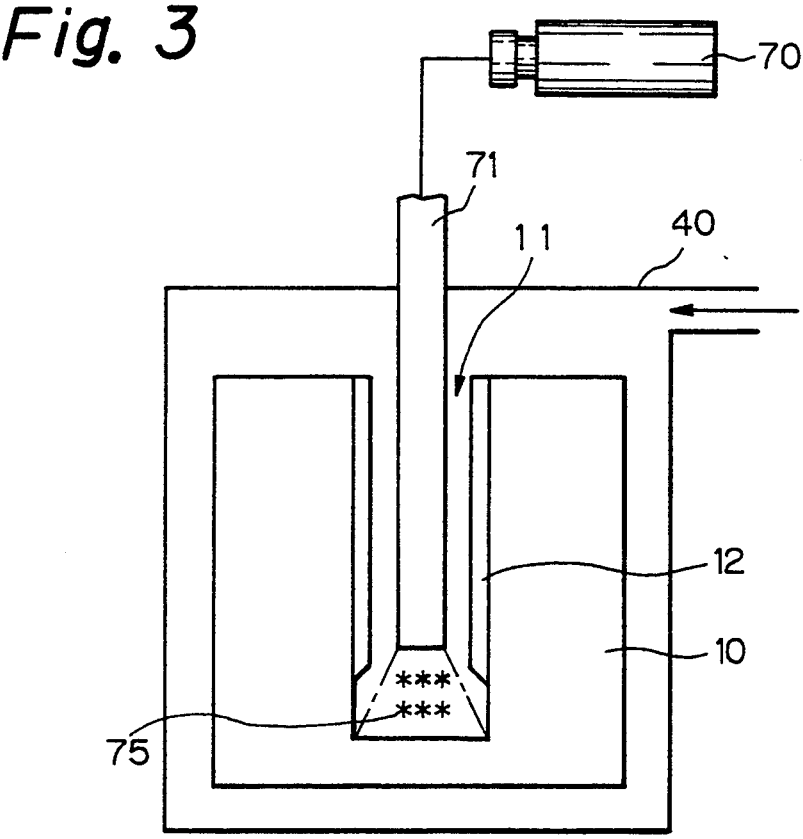
FIG. 3 is a view showing the essential part of a micro machining apparatus according to a second embodiment of the present invention.

FIG. 3 shows a micro machining apparatus according to the second embodiment of the present invention.

This embodiment employs an optical fiber 71 instead of the machining electrode 21 of the first embodiment. The leading end of the optical fiber 71 emits a light beam toward a workpiece. The beam irradiates a limited zone (an optically assisted reaction zone) 75 where a reactive gas 50 is decomposed and dissociated into active species. Unlike the first embodiment that employs plasma to produce active species, the second embodiment employs light energy to produce the same. In FIG. 3, numeral 70 denotes a light source such as a laser. Similar to the first embodiment, the second embodiment produces active species only at the tip of the optical fiber 71 and forms a protective film 12 over the sidewall of an etched hole.

The first and second embodiments may be properly combined together. Such a combination produces plasma to dissociate a reactive gas and, at the same time, emits a laser beam to promote a reaction between the reactive gas and a workpiece, to thereby make a deep trench.

Figure 4:
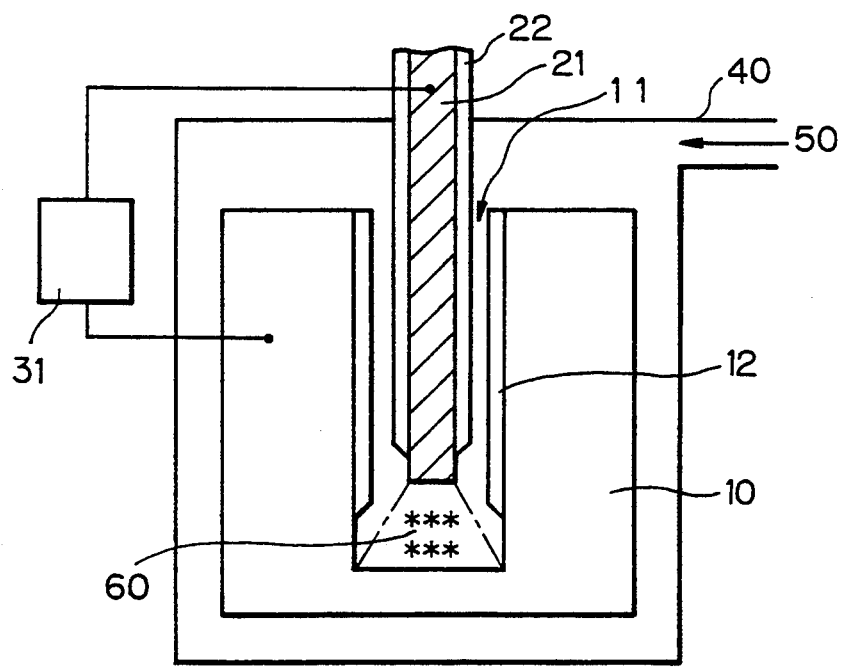
FIG. 4 is a view showing the essential part of a micro machining apparatus according to a third embodiment of the present invention.

FIG. 4 shows the essential part of the third embodiment of the present invention.

This embodiment resembles to the first embodiment except that it employs a machining electrode 21 coated with an insulation material 22. The insulation material 22 prevents the body of the machining electrode 21 from producing unwanted plasma that may etch the sidewall of a workpiece 10, and lets a reactive gas decompose and dissociate only at the tip of the machining electrode 21.

Figure 5:
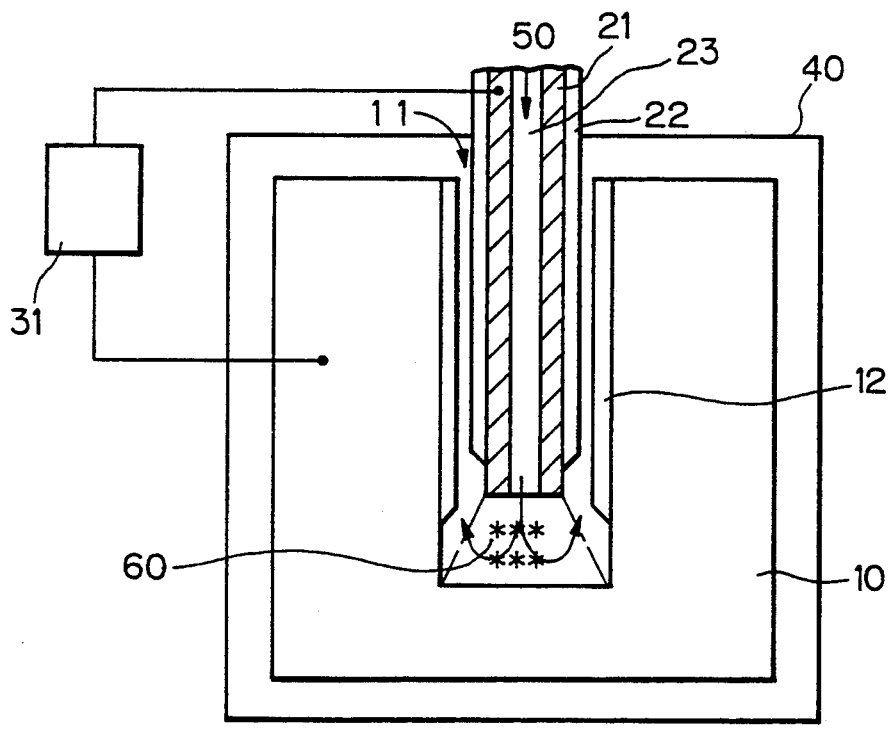
FIG. 5 is a view showing the essential part of a micro machining apparatus according to a fourth embodiment of the present invention.

FIG. 5 shows the essential part of a fine trench machining apparatus according to the fourth embodiment of the present invention.

A machining electrode 21 of this embodiment has a tubular hollow 23. The hollow 23 guides a reactive gas 50. Other parts of this embodiment are the same as those of the third embodiment.

According to the first to third embodiments, the reactive gas 50 diffuses in the vacuum vessel 40 and spontaneously enters the trench 11 of the workpiece 10. As the trench deepens, therefore, the gas hardly reaches the bottom of the trench. This is particularly critical when a clearance between the machining electrode 21 or the optical fiber 71 and the trench 11 is very narrow.

To surely guide the reactive gas 50 up to the reaction zone between the leading end of the machining electrode 21 and the bottom of the trench, the fourth embodiment of FIG. 5 discharges the reactive gas 50 from the leading end of the machining electrode 21, so that a fresh reactive gas is always supplied to the plasma zone 60 and the gas used is sent upward through a space between the machining electrode 21 and the trench 11. The reactive gas never stays in the trench.

Figure 7:
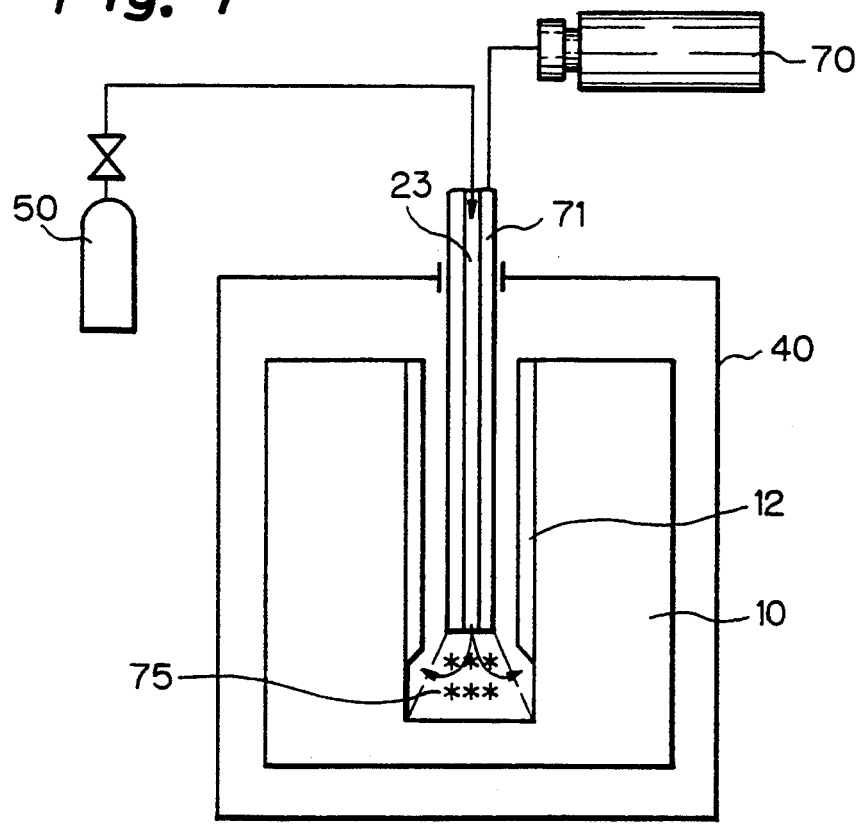
FIG. 7 is a view showing the essential part of a micro machining apparatus according to a fifth embodiment of the present invention.
Figure 6A:
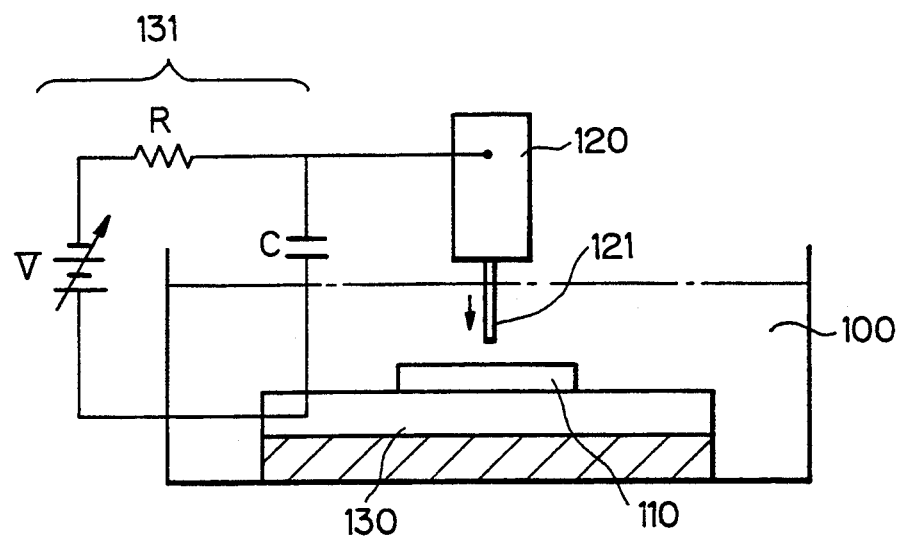
FIG. 6(a) is a view showing an electric discharge machining apparatus for machining a small hole, according to a prior art.
Figure 6B:
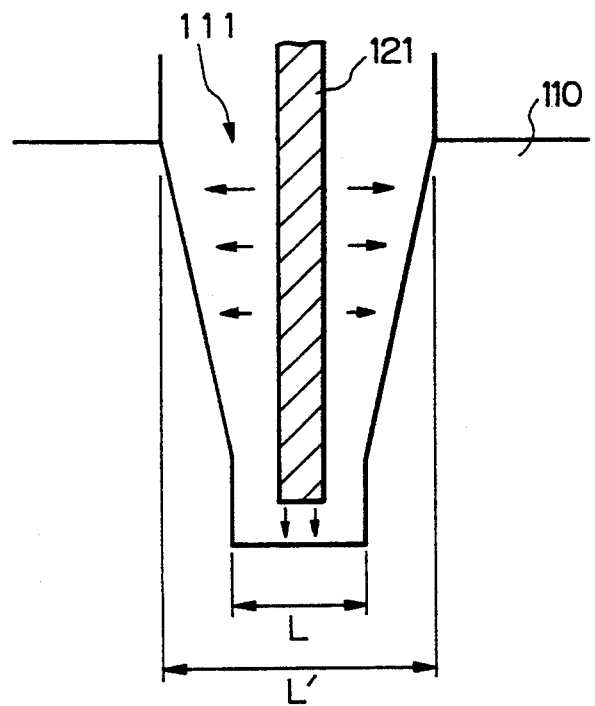
FIG. 6(b) is a view explaining the problem of the apparatus of FIG. 6(a)

FIG. 7 shows the essential part of the fifth embodiment, which applies the idea of the fourth embodiment to the optically assisted reaction technique of the second embodiment.

Figure 8A:
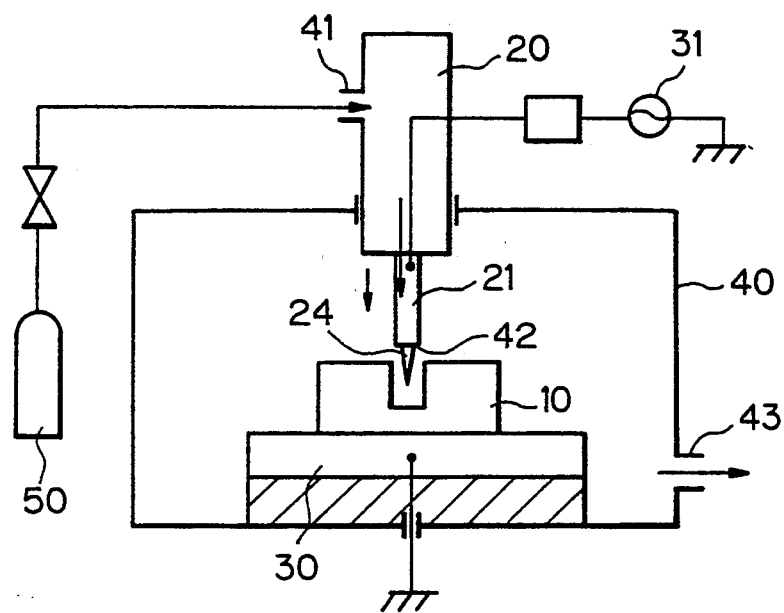
FIG. 8(A) is a view showing a micro machining apparatus according to a sixth embodiment of the present invention.
Figure 8B:
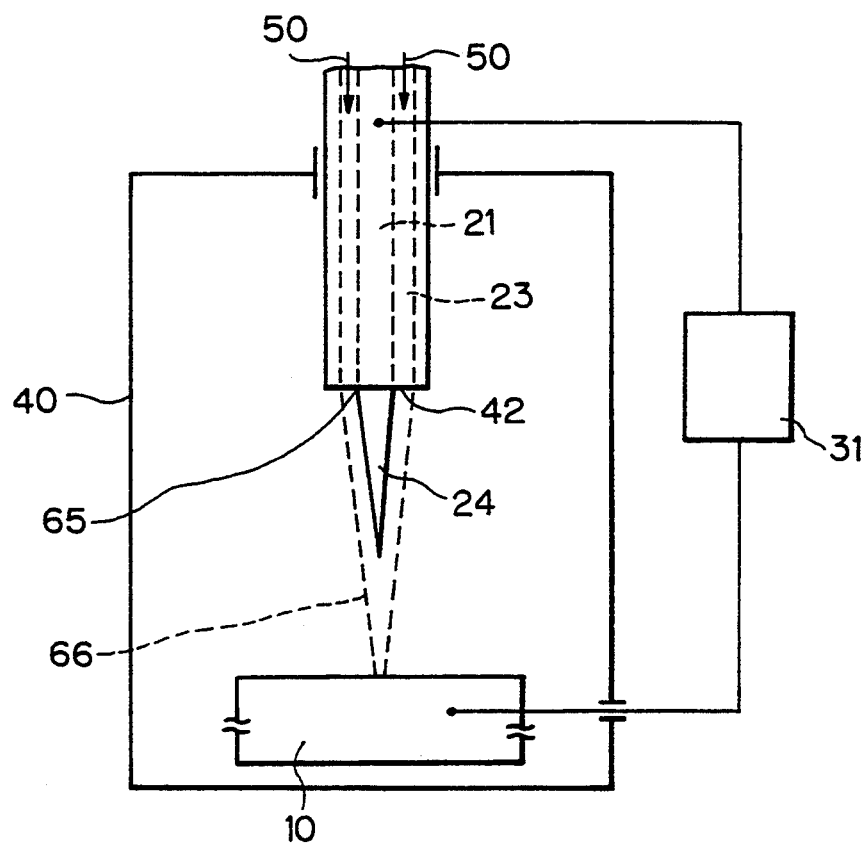
FIG. 8(B) is a view showing the essential part of the sixth embodiment.

FIG. 8(a) shows a micro machining apparatus according to the sixth embodiment of the present invention, and FIG. 8(b) shows the essential part of FIG. 8(a).

A workpiece 10 is held by a holder electrode 30 in a vacuum vessel 40 in FIG. 8. The holder electrode 30 is an anode electrode having an anode coupling structure.

Opposite to the anodic holder electrode 30, there is disposed a cathodic thin metal tube 21 in the vacuum vessel 40. The thin metal tube 21 is connected to a power source (an RF power source in this embodiment) 31. A needle insulator 24 is connected to the leading end of the thin metal tube 21. A feed mechanism 20 feeds the thin metal tube 21 and needle insulator 24 together toward the workpiece 10. The diameters of the thin metal tube 21 and needle insulator 24 are determined depending on the diameter of a trench to be formed in the workpiece 10. Namely, trenches having different diameters will be made by replacing the thin metal tube 21 and needle insulator 24 with others.

A reactive gas 50 is introduced through an inlet 41, the feed mechanism 20, and a guide hole 23 formed inside the thin metal tube 21, and is supplied toward the surface of the workpiece 10 through a discharge opening 42 located at the leading end of the thin metal tube 21. The introduced reactive gas 50 is converted by creeping discharge on the surface of the needle insulator 24 into reactive plasma species such as radicals and ions. These reactive species chemically react with or locally hit the workpiece 10, to thereby etch the workpiece 10. The gas reacted is discharged through a discharge port 43.

To stably produce plasma for etching the workpiece 10, it is necessary to discharge sufficiently accelerated electrons. To achieve this, this embodiment provides a triple contact 65 comprising the needle insulator 24, the cathodic thin metal tube 21, and a vacuum (a plasma gas).

The triple contact 65 easily collects an electric field for discharging electrons. Supposing the needle insulator 24 has a dielectric constant of $\varepsilon r$, an electric field generated in a clearance around the triple contact 65 is about $\varepsilon r$ times as strong as that generated in a vacuum. When the needle insulator 24 is made of alumina ceramics having a relatively high dielectric constant ranging from 8.0 to 10.0, the electric field generated around the triple contact 65 will be about ten times as strong as that generated in a vacuum. With this strong electric field, the quantities of electrons discharged from the vicinity of the triple contact 65 are increased as follows:

$$jf = A \cdot E^2 \exp(-B/_E) \quad (4)$$

where jf is a current per unit area, A is a constant, E is electric field strength (V/m), $B = 6.8 \times 10^9 \cdot \phi^{3/2}$, and $\phi$ is a work function (eV) of the cathode.

The cathodic thin metal tube 21 (in particular, the triple contact 65) emits electrons, which are accelerated by the electric field between the cathode and the anode and hit the surface of the needle insulator 24. As a result, the surface of the needle insulator 24 discharges secondary electrons. Since the surface of the needle insulator 24 is substantially in parallel with the electric field, the surface emits one or more secondary electrons with respect to each primary electron that hits the surface. This is an electron increasing action. The secondary electrons discharged from the whole surface of the needle insulator 24 produce a creeping discharge phenomenon with a long discharge distance to promote the generation of radicals for etching the workpiece 10. The reactive gas 50 is passed along the surface of the needle insulator 24 and supplied to the surface of the workpiece 10. While being passed along the surface of the needle insulator 24, the reactive gas 50 is efficiently converted into plasma by the creeping discharge on the surface of the needle insulator 24. The discharge distance of the creeping discharge is always longer than the Debye length, to stably produce plasma, i.e., active species.

Since the whole surface of the needle insulator 24 discharges electrons, plasma is formed around the needle insulator 24. Accordingly, a plasma gas flow 66 does not diffuse between the tip of the needle insulator 24 and the workpiece 10 and, therefore, is effectively used to locally etch the workpiece 10 at atomic level.

The feed mechanism 20 feeds the thin metal tube 21 and insulator 24 toward the workpiece 10 according to the etching conditions of the workpiece 10, to form a trench having an optional depth. The creeping discharge secures a discharge distance, so that it is not necessary to strictly control a distance between the leading end of the needle insulator 24 and the etched bottom of the workpiece 10.

The composition of the reactive gas is properly selected according to the material of the workpiece. If the material is silicon, the reactive gas may be F- or Br-based gas.

Figure 9A:
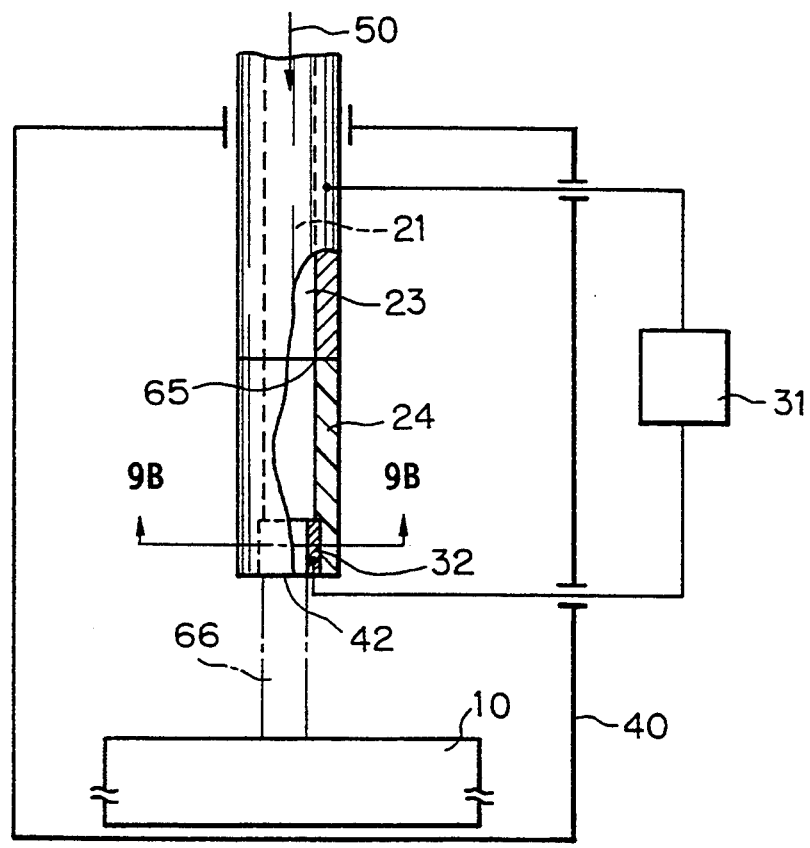
FIG. 9(A) is a view showing the essential part of a micro machining apparatus according to a seventh embodiment of the present invention.
Figure 9B:
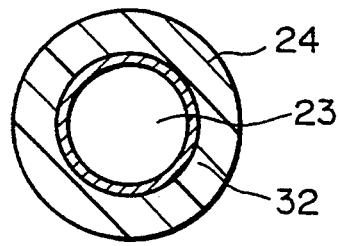
FIG. 9(B) is a sectional view taken along a line A—A of FIG. 9(A)
Figure 10:
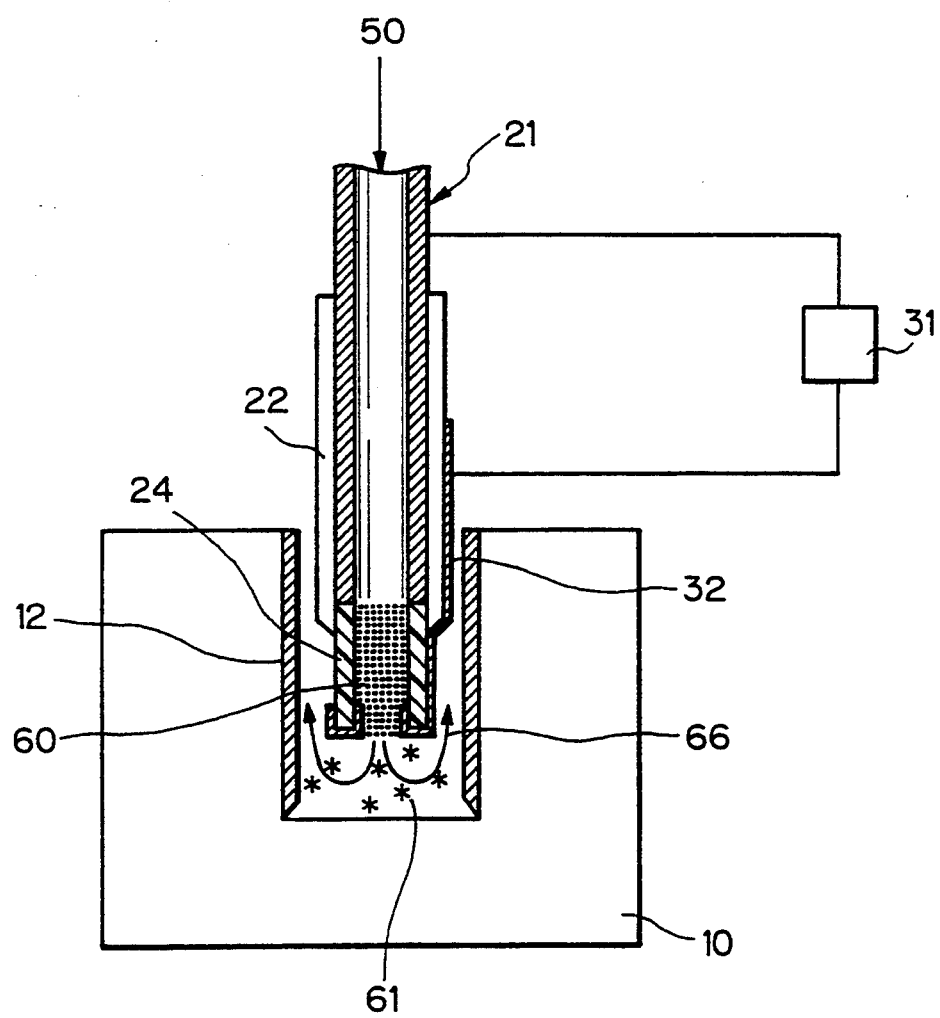
FIG. 10 is a view showing a trench being machined by the apparatus of the seventh embodiment.

FIGS. 9 and 10 show the seventh embodiment of the present invention. Unlike the sixth embodiment that requires a workpiece to be electrically conductive to cause electric discharge, the seventh embodiment easily produces creeping discharge irrespective of the material of a workpiece. FIG. 9(a) is a partly broken view showing the seventh embodiment, FIG. 9(b) is a sectional view taken along a line A—A of FIG. 9(a), and FIG. 10 is a view showing a trenching process of the embodiment. In these figures, the same parts as those of FIGS. 1 and 8 are represented with like reference marks.

The seventh embodiment employs a tubular insulator 24. An annular anode electrode 32 is disposed inside the leading end portion of the tubular insulator 24 so that creeping discharge may occur inside the tubular insulator 24 to form a plasma zone 60 inside the tubular insulator 24. A reactive gas 50 is passed through a guide hole 23 to produce active species 61 in the plasma zone 60. The active species 61 are sent toward the surface of a workpiece 10.

A cathodic thin metal tube 21 is coated with an insulation material 22 for isolating the cathode 21 from the anode 32.

This arrangement can produce creeping discharge irrespective of the material of the workpiece 10 and enables the thin metal tube 21 and insulator 24 to be brought very close to the workpiece 10, to improve machining accuracy and finished surface accuracy.

Figure 11:
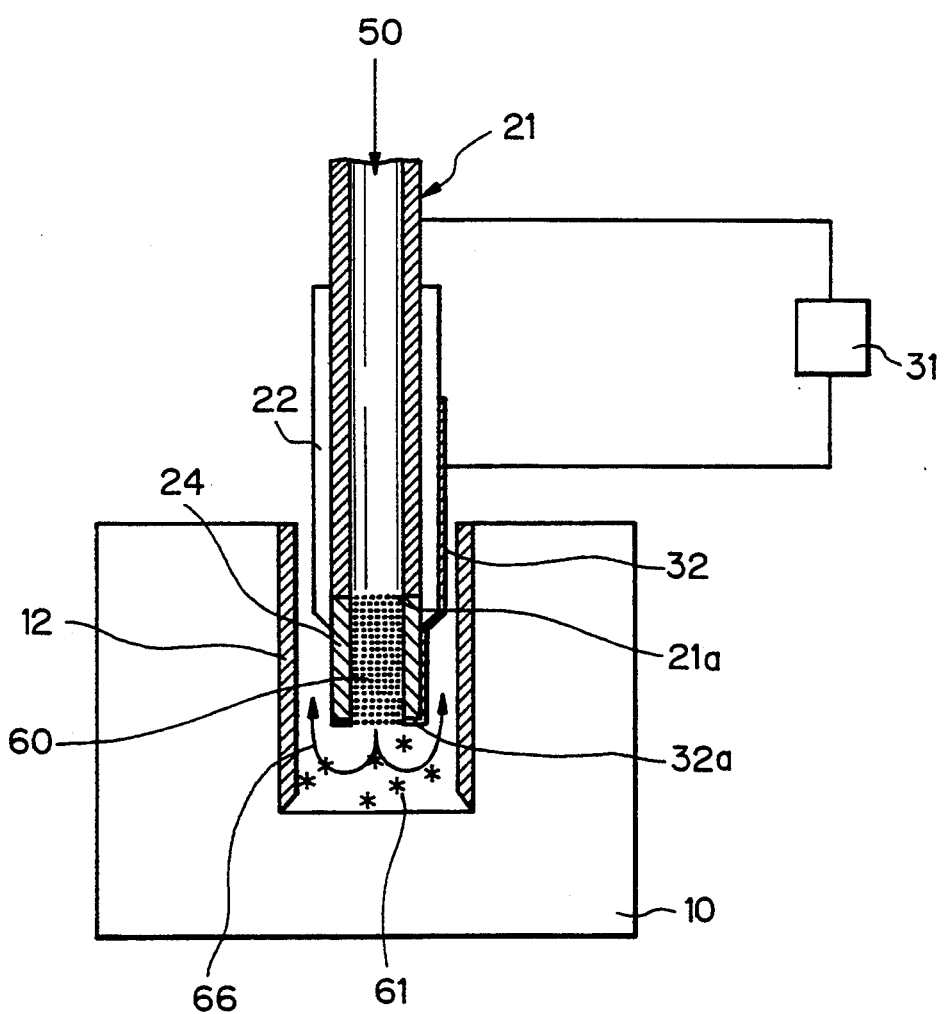
FIG. 11 is a view showing the essential part of a micro machining apparatus according to an eighth embodiment of the present invention.

FIG. 11 shows a micro machining apparatus according to the eighth embodiment of the invention.

The eighth embodiment is the same as the seventh embodiment except that an electrically conductive mesh 21a is disposed between a tubular insulator 24 and a thin metal tube 21 and another electrically conductive mesh 32a over a front opening of the tubular insulator 24. The mesh 32a is connected to an anode electrode 32.

In this arrangement, electrons that trigger discharge run in a space in the tubular insulator 24, unlike the seventh embodiment in which electrons run along the surface of the tubular insulator 24. Accordingly, the eighth embodiment more efficiently discharges than the seventh embodiment.

As explained above, the present invention decomposes and dissociates a reactive gas (50) only in a limited zone (the plasma zone 60 or the optically assisted reaction zone 75) between the front leading end of a very thin linear member (the machining electrode 21 or the optical fiber 71) and the bottom of an etched trench (11) of a workpiece (10) and never damages the remaining part of the workpiece. Namely, the present invention etches only the close vicinity of the bottom of the etched trench of the workpiece. This limited etching is helped by the sidewall protective effect of a protective film (12) formed from reaction products that are produced by etching in the reaction zone and adhere to and deposit on the sidewall of the etched trench.

The present invention employs a feed mechanism (20) for feeding the very thin linear member (the machining electrode 21 or the optical fiber 71) toward the workpiece (10), to form the trench (11) having an optional depth in the workpiece. Since the sidewall of the trench is not affected by the active species produced in the reaction zone, the trench may have a uniform shape in a depth direction. The present invention etches the trench at atomic level so that the finished surface of the trench is very smooth compared with one formed by a conventional electric discharge machining apparatus.

The protective film (12) adhered to the sidewall of the trench (11) may easily be removed by wet etching, etc., after the completion of the etching of the trench.

The present invention produces creeping discharge irrespective of the material of the workpiece (10) and enables the machining means (the thin metal tube 21 and insulator 24) to approach very close to the workpiece, thereby improving machining accuracy and finished surface accuracy.

We claim:

1. A micro machining apparatus comprising:
   a machining member having a metal body and an insulator, the insulator being in contact with at least one end of said metal body and having a leading end facing a workpiece, the metal body being very thin and linear, and the insulator also being very thin and linear and extending from the leading end of the metal body;
   electric field producing means for producing an electric field with the metal body of the machining member as a cathode, the electric field starting from the workpiece and spreading substantially in parallel with a longitudinal surface of the insulator; and
   reactive gas supplying means for supplying a reactive gas along the surface of the insulator toward the surface of the workpiece, said reactive gas supplying means supplying a reactive as that reacts with the material of the workpiece to thereby etch the workpiece.

2. The micro machining apparatus according to claim 1, wherein the thin linear metal body has a tubular structure serving as the reactive gas supplying means for guiding the reactive gas toward the surface of the insulator.

3. The micro machining apparatus according to claim 1, wherein the electric field producing means includes an anode connected to the workpiece.

4. The micro machining apparatus according to claim 1, wherein the electric field producing means includes an anode connected to the leading end of the insulator that faces the workpiece.

5. The micro machining apparatus according to claim 1, wherein the electric field producing means includes an anode connected to the workpiece.

6. The micro machining apparatus according to claim 2, wherein the electric field producing means includes an anode connected to the leading end of the insulator that faces the workpiece.

7. The micro machining apparatus comprising:
   a machining member having a metal body and an insulator, the insulator being in contact with at least one end of said metal body and having a leading end facing a workpiece, the leading end of the insulator having a needle-like shape;
   electric field producing means for producing an electric field with the metal body of the machining member as a cathode, the electric field starting from the workpiece and spreading substantially in parallel with a longitudinal surface of the insulator; and
   reactive gas supplying means for supplying a reactive gas along the surface of the insulator toward the surface of the workpiece, said reactive gas supplying means supplying a reactive gas that reacts with the material of the workpiece to thereby etch the workpiece.

8. A micro machining apparatus comprising:
   a very thin linear machining member having, at the leading end thereof, a discharge opening for blowing a reactive gas toward a workpiece, a reactive gas supplying means for supplying a reactive gas that reacts with a material of the workpiece to thereby etch the workpiece, wherein the machining member is a hollow nozzle composed of two electric hollow conductor tubes and a hollow insulator interposed between the conductors, and wherein a power source applies a voltage to both of said conductors provided at each end of the insulator;
   means for positioning the machining member opposite to the workpiece and feeding the machining member toward the workpiece while maintaining a constant distance between the machining member and an area to be etched of the workpiece; and
   means for locally decomposing and dissociating the reactive gas into active species in a zone between the leading end of the machining member and the workpiece.

* * * * *